No. 754,522. PATENTED MAR. 15, 1904.
C. W. VOLLMANN.
FREEZING TANK.
APPLICATION FILED NOV. 3, 1902.
NO MODEL.
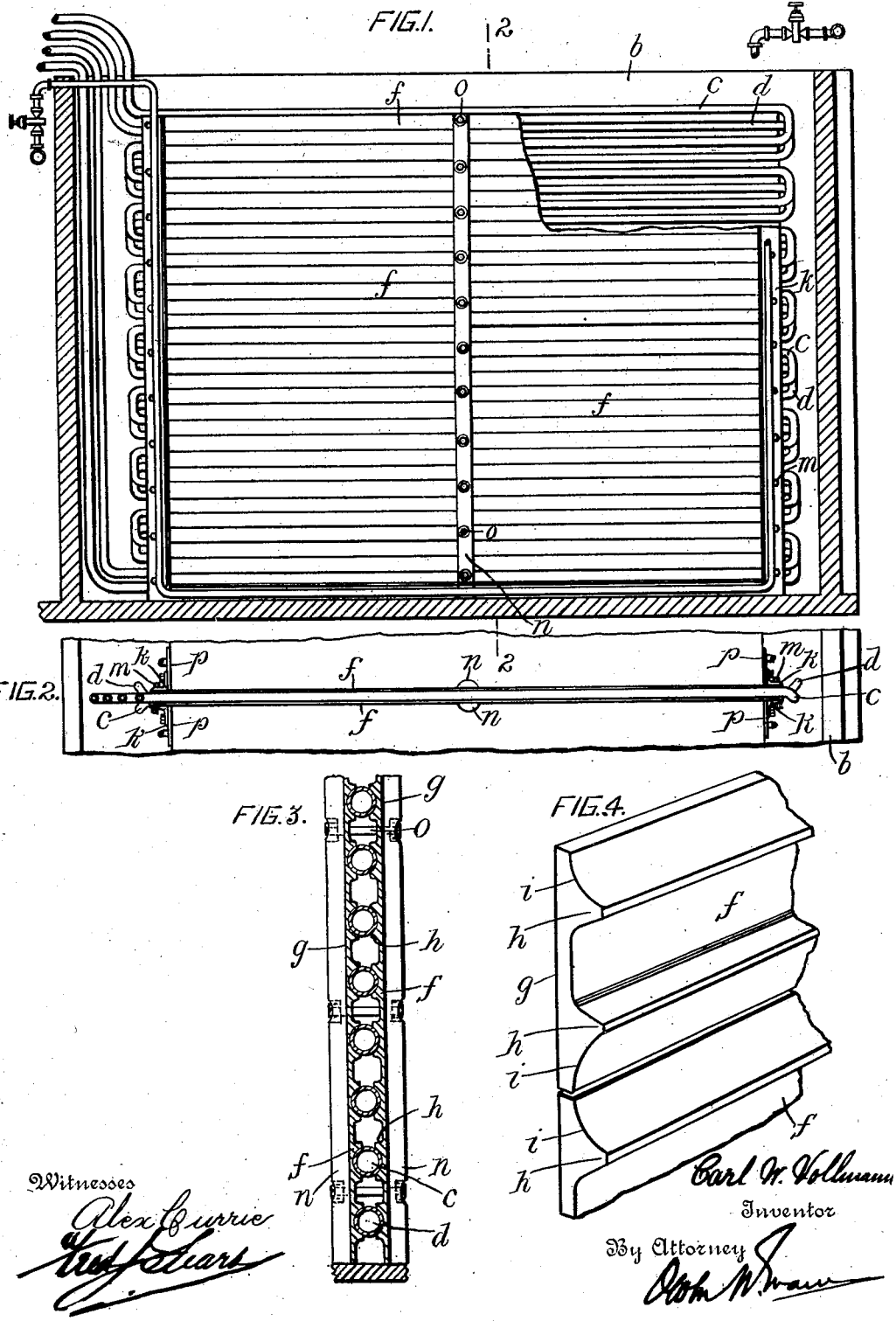

No. 754,522. Patented March 15, 1904.

UNITED STATES PATENT OFFICE.

CARL WILHELM VOLLMANN, OF MONTREAL, CANADA.

FREEZING-TANK.

SPECIFICATION forming part of Letters Patent No. 754,522, dated March 15, 1904.

Application filed November 3, 1902. Serial No. 130,002. (No model.)

*To all whom it may concern:*

Be it known that I, CARL WILHELM VOLLMANN, of the city of Montreal, district of Montreal, and Province of Quebec, Canada, have invented certain new and useful Improvements in Freezing-Tanks; and I do hereby declare that the following is a full, clear, and exact description of the same.

My invention relates particularly to the walls of freezing-tanks; and it has for its object to provide a wall which will insure the even distribution of cold through the freezing-surface thereof.

The invention may be said, briefly, to consist in providing a series of wall members in the form of strips having their side edges enlarged in thickness by a projection extending throughout the length of each of said side edges and having the portion thereof adjoining the edge of concave form and adapted to fit tightly upon the perimeter of tubular freezing-sections, while these wall members are arranged with their side edges adjoining, thus constituting a complete wall.

For full comprehension, however, of my invention reference must be had to the accompanying drawings, forming a part of this specification, in which similar reference characters indicate the same parts, and wherein—

Figure 1 is a side elevation, partly in section, of a freezing-tank provided with a wall constructed according to my invention. Fig. 2 is a plan view thereof. Fig. 3 is a vertical sectional view of my improved freezing-wall, taken on line 2 2, Fig. 1; and Fig. 4 is a detail perspective view illustrating my improved wall members removed.

The tank $b$, tubular brine and ammonia conducting sections $c$ and $d$, respectively, are and may be of any preferred construction, and as they form no part of my present invention I will not describe them in detail. These tubular sections $c$ and $d$ are arranged horizontally and a distance apart about equal to the diameter thereof. Each wall, one of which is shown in cross-section in Fig. 3, comprises said tubular sections and a series of wall members $f$, with plane outer surfaces $g$ and a pair of inwardly-projecting ribs $h$ on the inside surface adjacent to the side edges and extending throughout their lengths, the portion of these ribs adjoining the edges being concaved, as at $i$, to fit upon the perimeter of the tubular sections, and each incloses the portion of the latter contiguous to a point in a plane extending horizontally through the center thereof. Portions of a pair of these wall members are shown removed in Fig. 4.

The wall members of my improved wall are secured together by angle-irons $k$, one near each end of each side thereof, and a series of bolts $m$, projecting through said angle-irons and wall members and between the ammonia and brine sections. A pair of vertical strips $n$, one at the middle of each side of the wall and secured in place by bolts $o$, serve as stiffness for the wall members. These angle-irons also serve as a means for securing the usual squaring-plates $p$ in place.

The advantage attendant upon this construction is that the heat will be taken more readily from the concave portions of the wall members by the tubular sections and the complete wall thereby more quickly chilled on account of the concave portions partially surrounding and fitting tightly the tubular surface.

What I claim is as follows:

In a freezing-tank, a freezing-wall comprising a series of tubular members extending from end to end of the wall and arranged a short distance apart, and a series of wall members consisting of strips extending from end to end of said tubular members and arranged with their edges abutting, said strips presenting plane outer surfaces collectively forming a wall with a plane surface the inside surface of each of said wall members having a pair of ribs, one located adjacent to and extending from end to end of each side edge thereof, and the portion of said ribs contiguous to said edges being concaved to fit upon said tubular members, substantially as described and for the purpose set forth.

In testimony whereof I have affixed my signature in presence of two witnesses.

CARL WILHELM VOLLMANN.

Witnesses:
WILLIAM P. MCFEAT,
FRED. J. SEARS.